US 6,544,141 B1

(12) United States Patent
Fuchs et al.

(10) Patent No.: US 6,544,141 B1
(45) Date of Patent: Apr. 8, 2003

(54) CONTROL METHOD AND CONTROL DEVICE FOR AN INFINITELY VARIABLE CHANGE-SPEED GEAR

(75) Inventors: Emanuel Fuchs, Fahrenzhausen (DE); Bertrand Daieff, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/743,770

(22) PCT Filed: Jul. 6, 1999

(86) PCT No.: PCT/EP99/04670

§ 371 (c)(1),
(2), (4) Date: Apr. 3, 2001

(87) PCT Pub. No.: WO00/04306

PCT Pub. Date: Jan. 27, 2000

(30) Foreign Application Priority Data

Jul. 14, 1998 (DE) .......................................... 198 31 514

(51) Int. Cl.⁷ ............................................. B60K 41/12
(52) U.S. Cl. .............................. 477/44; 477/46; 477/97; 701/53; 701/56
(58) Field of Search ............................. 477/44, 41, 97, 477/115, 46; 701/52, 54, 56, 53

(56) References Cited

U.S. PATENT DOCUMENTS

| 3,043,152 A | | 7/1962 | Karig et al. ............... 74/230.17 |
| 4,836,056 A | * | 6/1989 | Nakawaki et al. ............ 477/39 |
| 5,514,050 A | * | 5/1996 | Bauerle et al. .............. 477/118 |
| 5,609,544 A | * | 3/1997 | Lardy et al. .................. 477/46 |
| 5,624,348 A | * | 4/1997 | Lardy et al. .................. 477/46 |
| 5,919,112 A | * | 7/1999 | Michael et al. ................ 477/99 |
| 5,947,861 A | * | 9/1999 | Nobumoto .................... 477/37 |

FOREIGN PATENT DOCUMENTS

| DE | 42 39 133 C1 | 11/1992 | |
| DE | 43 12 718 A1 | 4/1993 | |
| DE | 196 09 585 A1 | 3/1996 | |
| DE | 197 13 399 A1 | 4/1996 | |
| EP | 0 584 985 A1 | 8/1993 | |
| EP | 0 676 564 A2 | 3/1995 | |
| EP | 0 681 119 A2 | 4/1995 | |
| EP | 798493 | * 10/1997 | ........... B60K/20/02 |
| EP | 997668 | * 5/2000 | ........... F16H/59/02 |
| JP | 08074994 A | 3/1996 | |

OTHER PUBLICATIONS

International Search Report w/ translation of that portion of Search report indicating degree of relevance found.
German Search Report w/ translation of that portion of Search report indicating degree of relevance found.

* cited by examiner

Primary Examiner—Sherry Estremsky
Assistant Examiner—Tisha D. Lewis
(74) Attorney, Agent, or Firm—Crowell & Moring LLP

(57) ABSTRACT

An arrangement for controlling an infinitely variable vehicle transmission includes an adjusting element which is operable in two modes. In a first mode, the adjusting element can be actuated to select from predetermined transmission gear settings. In the second mode, it can be actuated to cause a continuous adjustment of the vehicle gear. The direction, speed and manner of such adjustment depend on the manner in which the adjusting element is actuated, and optionally vehicle operating parameters. In addition, the adjusting element can be used to select from among driving control modes based on predetermined algorithms, for achieving maximum economy or maximum performance.

20 Claims, 3 Drawing Sheets

CONTROL METHOD AND CONTROL DEVICE FOR AN INFINITELY VARIABLE CHANGE-SPEED GEAR

BACKGROUND AND SUMMARY OF THE INVENTION

This application claims the priority of German patent document 198 31 514.7, filed Jul. 14, 1998 and PCT International Application No. PCT/EP99/04670, filed Jul. 6, 1999, the disclosures of which is expressly incorporated by reference herein.

The invention relates to a method and apparatus for controlling an infinitely variable change speed gear of a motor vehicle, including provision for manual action of a selector level by the vehicle operator.

In known infinitely variable automatic change speed gears for a motor vehicle, a change of the transmission can take place infinitely, and without shifting points along the entire driving range. The transmission is usually set automatically as a function of vehicle operating condition, such that the engine can, as a rule, be operated in proximity to its operating point which is optimal with respect to the effect. Such infinitely variable automatic change speed gears relieve the driver, and can achieve a higher overall efficiency than conventional change speed gears, although they have a lower mechanical efficiency because the engine always runs in the proximity of the operating point which is optimal with respect to the effect. In addition, the spread is usually larger and the number of possible gears is unlimited in the case of infinitely variable automatic change speed gears.

German Patent Document DE-AS 12 24 580 discloses an infinitely adjustable V-belt change speed gear in which the adjustment of the V-belt (and thus the adjustment of the transmission) is to take place by means of a lever which can be secured against a displacement.

In European Patent Document EP 0 217 221 A2, a method is discloses for controlling a CVT change speed gear and an auxiliary change speed gear. The CVT change speed gear and the auxiliary change speed gear are connected in series, and the shifting points of the auxiliary change speed gear are defined by means of stored shifting patterns. The shifting pattern that is used is selected via the selector lever.

German Patent Document DE 41 20 540 and European Patent Document EP 676 564 disclose methods and devices for controlling an infinitely variable change speed gear, having a control unit that has a first operating mode in which the gear of a change speed gear is set automatically as a function of signals of a selector device and operating variables of the vehicle. In addition, there is also a second operating mode in which a stepped change speed gear, which can be influenced directly by the driver, is simulated. The shifting steps or the number and spread of the change speed gears can be optimized according to the vehicle handling. These control arrangements, however, do not take into account the specific advantages of infinitely variable change speed gears. The latter change speed gears are treated as automatic quasi step gears.

German Patent Document DE 196 09 585 A1 discloses a method and apparatus for controlling an infinitely variable change speed to gear in which the adjustment of an arbitrary gear can be carried gout in a quasi infinitely variable manner. However, the method of actuating the operating element decides whether a significant or only a slightly larger or smaller gear is set. Thus, the change of the gear can be stopped by the adjusting path of the selector lever, the force acting upon it or its adjusting speed. A dependence can also be established on how long the selector lever or the operating element is held in its deflecting position. Thus, arbitrary smaller or larger gear jumps can occur when the transmission is adjusted.

One object of the invention is to provide a control method and apparatus for an infinitely variable change speed gear, in which an appropriate gear within the overall gear range of the change speed gear can be explicitly selected manually for each driving situation, or for each driving intention, taking into account the specific advantages of infinitely variable change speed gears.

This and other objects and advantages are achieved by the transmission control method and apparatus according to the invention, in which a selector device comprising an operating element that can be actuated in at least two directions is connected with a control unit, and emits to it a signal generated corresponding to an actuation. The control method has at least one operating mode in which the operator of the vehicle can influence directly the speed-increasing ratio by manual actuation of the selector device. That is, the speed-increasing ratio is changed directly corresponding to the control command of the vehicle operator.

According to a feature of the invention, when the selector device is actuated in one direction, the change first takes place by a minimum adjustment of the speed-increasing ratio toward a higher gear. When the selector device is actuated continuously, a continuous adjustment subsequently takes place in the direction of a higher gear. On the other hand, when the selector device is actuated in the other direction, the speed-increasing ratio is first set by a minimum adjustment toward a lower gear and, when the selector device is continuously actuated in this direction, a continuous adjustment takes place in the direction of a lower gear, specifically as long as the selector device is actuated.

In one embodiment of the invention, at the start of an actuation of the selector device in one direction, the speed-increasing ratio is adjusted continuously at a first defined adjusting speed in the direction toward a higher gear. If the actuation of the selector device is interrupted before a given time period has been reached, the speed-increasing ratio is adjusted to a predetermined value at a second adjusting speed greater than the first given adjusting speed. In this case, for example, the minimum adjustment can be carried out. If the selector is actuated for a period which lasts beyond the given time period, the continuous adjustment takes place in the direction of a higher gear at a third given adjusting speed until the actuation is interrupted. The third given adjusting speed is lower than the second but not the first adjusting speed; that is, it may also be equal to the first adjusting speed. An analogous process takes place when the selector device is actuated in the other direction.

According to another embodiment of the invention, in the case of a so-called tip command (brief actuation of the selector device in one direction), a minimum adjustment always takes place which corresponds to approximately one gear jump in a stepped shifting system. When the stepped shifting system has a conventional design, this minimum adjustment results in one rotational engine speed jump (for example, to approximately 1,500 r.p.m.). As required, a fast-reaction change of the rotational speed can be achieved in this case. However, the desire for a smaller rotational speed change (for example, between 0 and 1,500 r.p.m.) cannot be achieved. In another embodiment, therefore, a predefined adjustment in the sense of a gear jump takes place only after the detection of a short tip command (actuation time of the selector device in a direction below a given time period).

The adjusting speed during the continuous transmission change can preferably be a function of the actuation duration or the actuating pressure. This has the advantage that, when the adjustments are smaller, good proportioning is possible; at the same time, when the adjusting operations are larger, an excessive waiting period is unnecessary.

It is particularly advantageous for a special function to be implemented in one or both possible actuation directions of the operating element of the selector device, such that an automatic driving program or an automatic driving strategy becomes active when the selector device is actuated beyond the required extent. This can be accomplished, for example, by two successive tip commands within a predefined time window or an overpressing of a resistor, similar to a kick-down actuation. When the selector lever is actuated correspondingly in the direction of a higher gear, for example, an automatic driving strategy may be activated which aims at a no-compromise maximal economy—driving in the range of the minimum consumption.

Resumption of normal manual driving operation (that is, to the basic function) can take place by a brief actuation of the selector device in the opposite direction. In this case, the transmission selected by the preceding automatic program would preferably be maintained.

When the selector device is correspondingly actuated in the direction toward a lower gear, a driving program could be selected as a special automatic driving strategy that permits a maximal driving performance; that is, the speed-increasing ratio is in each case selected such that the respective maximal engine power is available for each throttle valve angle. In this case, comfort aspects can be taken into account, particularly with a view to frequent transmission changes with rapidly changing throttle valves. Also in the case of this driving program, normal manual driving operation can be resumed by actuating the selector device in the opposite direction.

In a special embodiment of the invention, it is possible to equip the selector device with a selector lever as the operating element, which can be moved back and forth in a manual shifting channel. In addition to this manual shifting channel, a parallel automatic shifting channel can preferably be provided, the automatic shifting channel and the manual shifting channel being connected with one another by a transverse shifting channel. In the automatic shifting channel, conventional selector lever positions, such as P (parking position), R (reverse driving position), N (neutral position) and D (normal driving position) can be provided. In the driving position D, an automatically controlled, normal driving operation would then be carried out. During the transition from one shifting channel into another, the respective other driving program could then be activated.

As an alternative, the selector device can also be a tip switch or two push button switches which are preferably arranged in the steering wheel. The change speed gear transmission changes can then be carried out by a corresponding actuating of the selector switches, without the driver's having to remove his hands from the steering wheel.

Other objects, advantages and novel features of the present invention will become apparent from the following detailed description of the invention when considered in conjunction with the accompanying drawings.

DETAILED DESCRIPTION OF THE DRAWINGS

Figure 1:
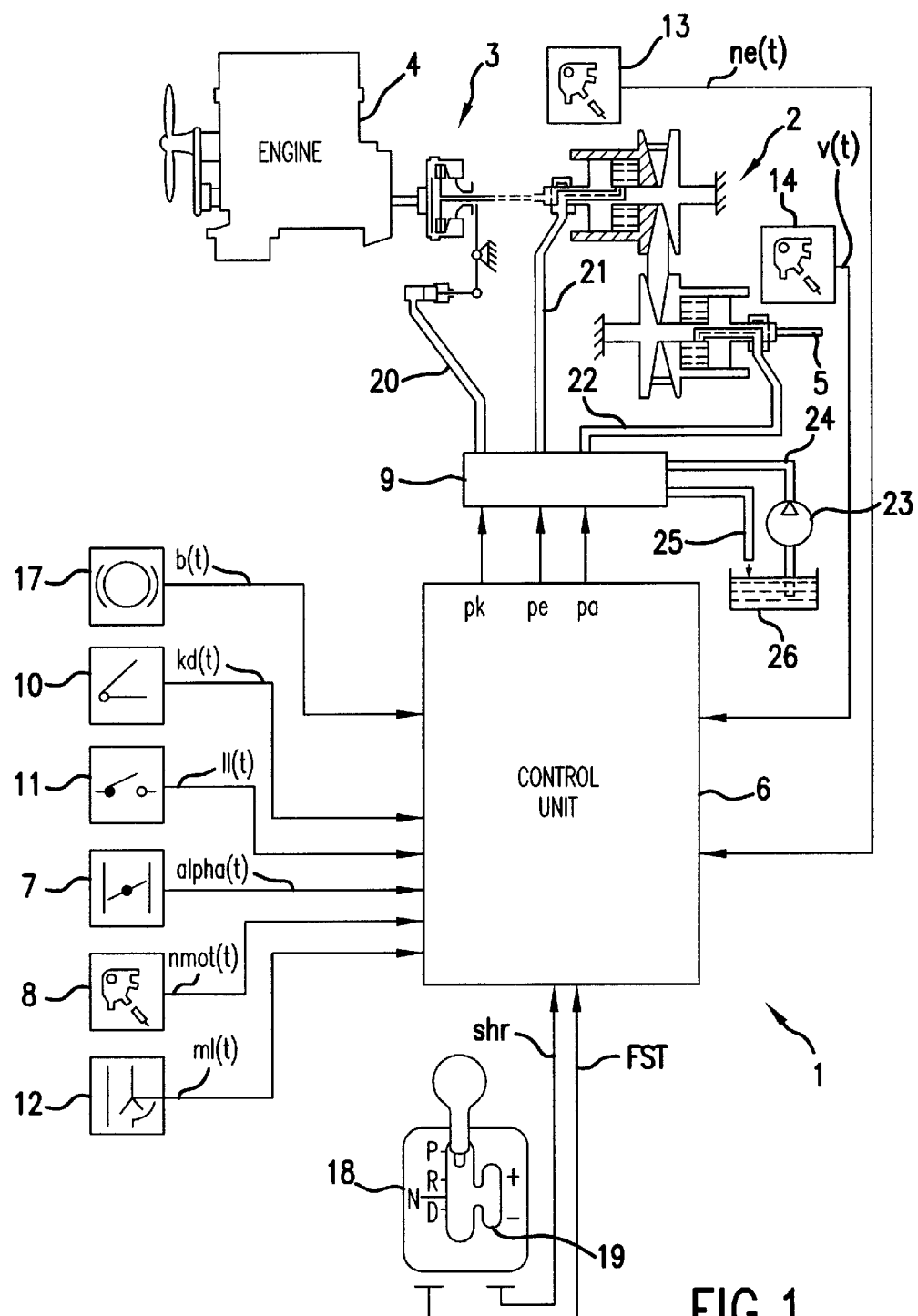
FIG. 1 is a schematic block diagram of a known electric control for an infinitely variable change speed gear of a motor vehicle.

FIG. 1 is a schematic block diagram of a generic control device 1 of an electro-hydraulically actuated infinitely variable change-speed gear 2, in this example of a loop gear. (Other infinitely variable change speed gears can of course be used as alternatives.) The infinitely variable change speed gear 2 is driven by an internal-combustion engine 4, via a controllable starting clutch 3. An output shaft 5 of the infinitely variable change speed gear 2 is connected with a wheel drive of a motor vehicle (not shown).

Driving commands can be transmitted to a control unit 6 by means of a selector lever of a selector device 18.

In a first channel (the automatic shifting channel) the driving positions P (park), R (reverse), N (neutral) and D (automatic adjustment of the speed increasing ratio) can be selected. When the driving position D is selected, a speed-increasing ratio is automatically adjusted on the basis of a predetermined algorithm, taking into account vehicle operating conditions.

The vehicle operating conditions which are taken into account here are the throttle valve signals $\alpha(t)$ emitted by a throttle valve sensor 7, the rotational engine speed signals nmot (t) emitted by a rotational engine speed sensor 8, the kick-down signals kd (t) emitted by a kick-down switch 10, the idling signals ll (t) emitted by an idling switch 11, the air flow rate signals ml (t) emitted by an air flow rate sensor 12, the change speed gear input rotational speed signals ne (t) emitted by a change speed gear input rotational speed sensor 13, the driving speed signals v(t) emitted by a driving speed sensor 14 and the braking signals b(t) emitted by a braking signal generator 17.

The selector lever of the selector device 18 can be moved from the driving position D into a second (manual) shifting channel 19, in which the selector lever operates as a toggle switch and the vehicle operator can manually adjust the gear of the change speed gear. The selector lever has a central neutral position, from which it can be moved toward the front (+) and back (−) for emitting signals. When it is released, it automatically returns into the neutral position.

The selector lever 18 emits a driving position signal FST and a shifting demand signal shr. This results in an "upshifting" or "lowering of the gear ratio, such that when the input rotational speed of the change speed gear remains the same, the output rotational speed increases. Inversely, the terms "downshifting" and "increasing the transmission" indicate a change of transmission in which the output rotational speed of the change speed gear is reduced while the input rotational speed remains the same.

As a function of the above-mentioned values, the control unit 6 controls the hydraulic pressure in a starting clutch 3 by way of a signal output pk and a valve block 9, and also controls (via signal outputs pe and pa) the speed-increasing ratio ue between the change speed gear input rotational speed ne(t) and the change speed gear output rotational speed (driving speed) v(t). For this purpose, the hydraulic block 9 connects corresponding control lines 20, 21 and 22 of the starting clutch 3 and the infinitely variable gear 2 with a pressure line 24 connected to a pump 23 or a return flow line 25 to a storage tank 26 for hydraulic fluid.

According to the invention, the shifting demand signal contains information from a sensor (not shown) in the selector unit 18 as to whether the selector lever has been actuated in a normal operating mode toward the front or toward the rear. In addition, the sensor supplies information as to whether the selector lever has been operated in a forced manner beyond a resisting element. In this case, a corresponding signal is emitted to the control unit 6.

As an alternative, the control unit 6 can also determine whether the selector lever has been operated twice in the same direction within a defined time period.

Figure 2:
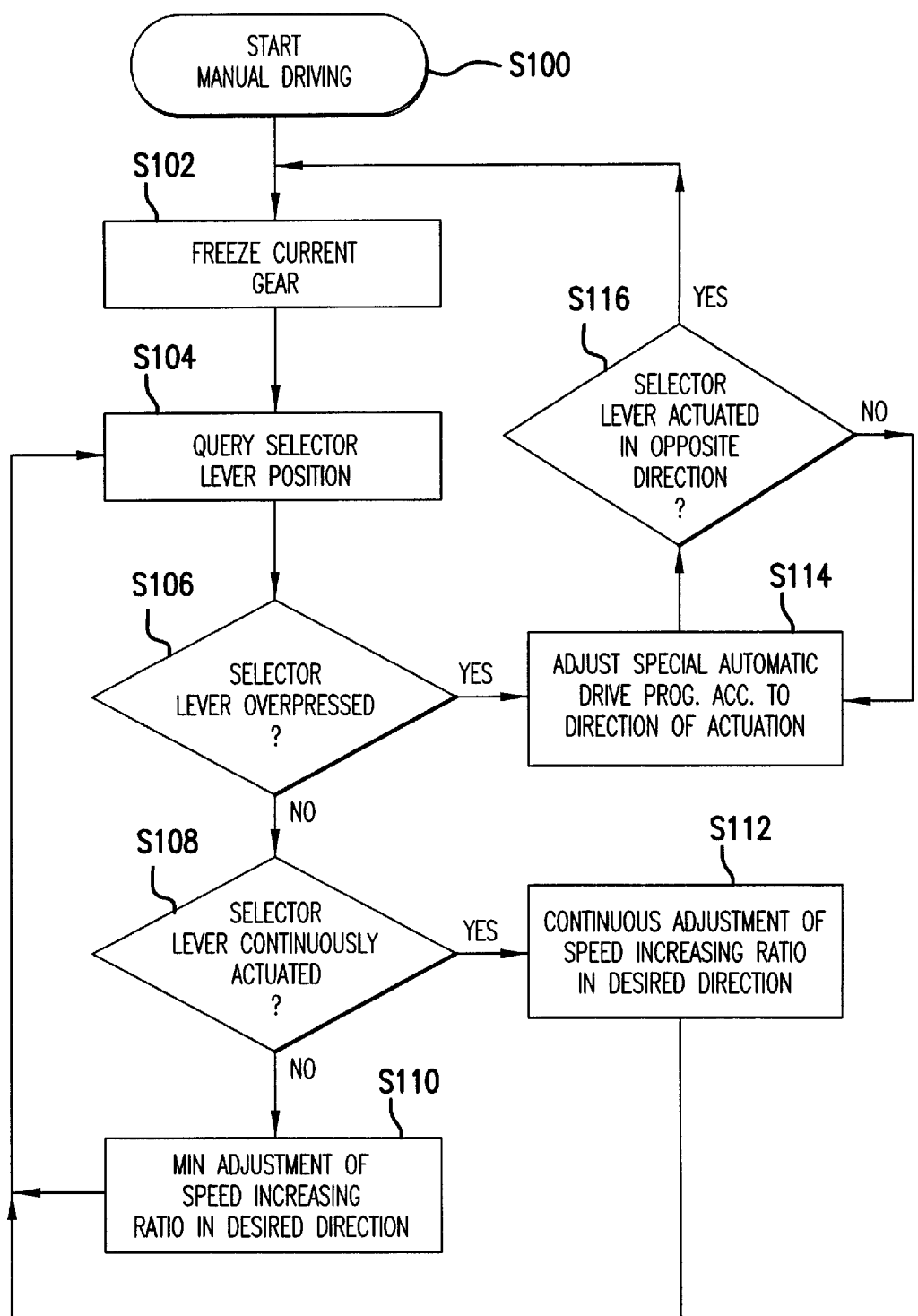
FIG. 2 is a flow chart for a first simple embodiment of the method according to the invention.
Figure 3:
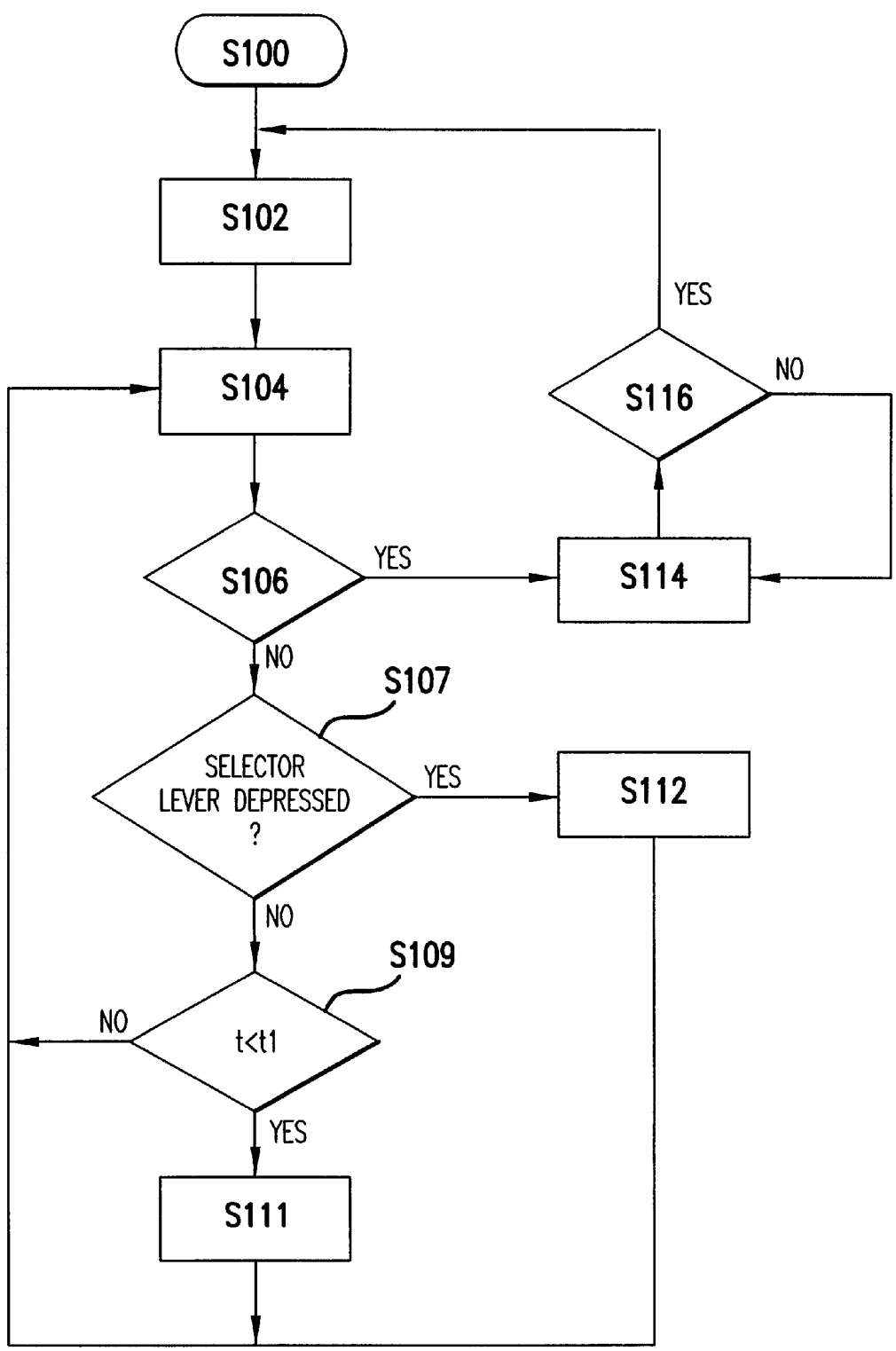
FIG. 3 is a flow chart for a second simple embodiment of the method according to the invention.

Corresponding to the shifting demand signal shr, the control unit 6 sets a speed-increasing ratio on the change speed gear according to the flow chart in FIG. 2 or FIG. 3.

According to the invention, the start of the manual driving operation S100 is initiated by displacing the selector lever from the automatic shifting channel into the manual shifting channel. In this case, the adjusted speed-increasing ratio is first frozen (that is, maintained) in step 102. Next, in step S104, the selector lever position is queried. If the selector lever of the selector device 18 remains in its neutral position, the speed-increasing ratio will not be changed. However, if an actuation of the selector lever is detected, it is first checked in step S106 where the selector lever was forced beyond a resisting element (similar to the case of the kick-down switch). If not, it is queried (according to FIG. 2) in step S108 whether the selector lever was actuated for the first time or continuously. If the selector lever has not been actuated continuously, but for the first time, in step S110, a minimum adjustment of the speed- increasing ratio in the desired direction takes placed on the change speed gear 2. That is, when the selector lever is actuated in the +direction in FIG. 1, a minimum adjustment takes place toward a higher gear. Such a minimum adjustment takes place for each new tip command. The minimum adjustment can be firmly defined or be made a function of the driving operation parameters.

As an alternative, according to FIG. 3 it is queried in step S107 whether the selector lever is actuated. If the selector lever is actuated, a continuous adjustment of the speed-increasing ratio is carried out in step S112 at a first slow adjusting speed. If the selector lever is not or no longer actuated, it is queried in step S109 whether the selector lever had been actuated previously for a time t which was shorter than a given time period t1. If this is so, in step S111, the speed-increasing ratio is adjusted to a predefined value, for example, according to step S110 in FIG. 2 in the form of a minimum adjustment, at a second adjusting speed which is increased with respect to the first adjusting speed. If it is determined in step S109 that the actuating time was shorter than the given time period (t1), the adjusting is interrupted. To simplify the process, in the present embodiment, the first adjusting speed is identical with the third adjusting speed which in block S112 will always be selected when the selector lever is actuated.

Subsequently, a return branching takes place and the selector lever position is queried again.

In step S108 (FIG. 2) or in step S107 (FIG. 3), if a continuous selector lever adjustment in the +direction is determined, a continuous transmission adjustment takes place toward a higher gear. In this case, the adjusting speed VG of the adjustment may be a function of the actuating duration (VG=f(t)). As an alternative, the adjusting speed can also be made a function of the actuating pressure (VG=f(p)).

When the selector lever position is not actuated or the selector lever has returned into its neutral position, the selected gear is maintained.

An analogous approach takes place when the selector lever is moved in the −direction. That is, as shown in FIG. 2, a minimum adjustment of the speed-increasing ratio toward a lower gear takes place per tip command. During a continuous actuation, a continuous transmission adjustment takes place toward a lower gear, the adjusting speed again being a function of the actuation period (VG=f(t)).

Depending on the actuation of the selector lever of the selector device 18, a manual and, during a longer selector lever actuation, a continuous transmission adjustment of the speed-increasing ratio of the automatic change speed gear therefore takes place. Thus, for each driving situation or for each driving intention, an appropriate transmission within the overall transmission range of the change speed gear can be explicitly selected manually. The driver is therefore, for example, capable of controlling the forward dynamics of his vehicle by means of the change-speed gear transmission, while the load is constant.

As an additional functionality, an adjustment of a special automatic driving program will take place if the selector lever is operated in a special manner in a defined direction. In the present case, this special actuation takes place by overpressing a resisting element. During a corresponding actuation in the +direction (++ function), an automatic driving strategy is activated which aims at a no-compromise driving in the range of maximal economy (consumption minimum).

Normal manual operation is resumed by a single actuation of the selector lever in the −direction, the last-adjusted output transmission being maintained.

Analogously, when the selector lever is overpressed in the −direction (−− function), an automatic driving program is activated which ensures maximum driving performance. In this case, a speed-increasing ratio is always selected such that, for each throttle valve angle, the maximal engine power will be available. Here, comfort aspects can be taken into account, particularly in view of frequent gear changes while throttle valves change rapidly. Also in this case, a return to the normal manual operation can take place by a single actuation of the selector lever in the +−direction.

It is of course apparent that driving programs other than those described above can also be selected as an alternative.

Also, instead of moving the selector lever in the manual channel, a toggle switch or a unit consisting of two push-buttons can be used to transmit the driving intention to the control unit 6. Such a toggle switch or such a push-button unit can advantageously be arranged on the steering wheel. During a manual change of the speed-increasing ratio, the vehicle operator must in this case not remove his hand from the steering wheel. This is advantageous, specifically in the present case, because a manual change speed gear transmission adjustment is preferred in the case of a particularly sporty driving mode where both hands of the vehicle operator should remain on the steering wheel.

Of course, the present invention can also be combined with other functionalities. For example, the control unit 6 can be designed to preclude a manually designated transmission change when the driving conditions or the engine operating data do not allow it for safety reasons. In addition, stability criteria of driving dynamics may play a role when selecting the change speed gear transmission.

By means of the present invention, it is possible to manually provide to the driver an appropriate gear within the overall transmission range for any driving situation. The invention also ensures a long service life of the change speed gear by the elimination of preferred transmission conditions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control method for an infinitely variable change speed gear of a vehicle transmission driven by an internal-combustion engine, in which a control unit connected with a selector device carries out a control method in at least one operating mode, in which a speed-increasing ratio of the change speed gear is influenced directly by the vehicle operator by manual actuation of the selector device in one of two possible actuating directions, wherein:

when the selector device is actuated in a first direction for a duration which is less than a given time period, the speed-increasing ratio is first adjusted toward a higher gear by a minimal adjustment that corresponds approximately to one gear jump in a step shifting transmission;

during a continuous actuation of the selector device in the first direction, a continuous adjustment is carried out in the direction of a higher gear;

when the selector device is actuated in a second direction for a duration which is less than the given time period, the speed-increasing ratio is first adjusted toward a lower gear by a minimal adjustment that corresponds approximately to one gear jump in a step shifting transmission;

during a continuous actuation of the selector device in the second direction, a continuous adjustment is made in the direction of a lower gear.

2. The control method according to claim 1, wherein:

as of the start of an actuation of the selector device in the first direction, the speed-increasing ratio is adjusted continuously at a first given adjusting speed in the direction of a higher gear;

when an actuation of the selector device is interrupted before expiration of the given time period, the speed-increasing ratio is adjusted to a predetermined value at a second given adjusting speed greater than the first given adjusting speed;

during an actuation of the selector device beyond the given time period, the speed-increasing ratio is adjusted continuously in the direction of a higher gear at a third given adjusting speed that is lower than the second but not lower than the first adjusting speed, until the actuation is interrupted; and when the selector device is actuated in the second direction, an adjustment is carried out analogously in the direction of a lower gear.

3. The control method according to claim 1, wherein an adjusting speed can be selected as a function of one of an actuation duration and an actuating pressure upon the selector device.

4. The control method according to claim 1, wherein upon occurrence of two actuations of the selector device in one of said first and second directions succeeding one another in a defined time window or the occurrence of an overpressing of a resisting element in the one direction, a special automatic driving program is selected, during which, on the basis of detected operating values, the control unit automatically selects a gear; and the special automatic driving program is terminated when the selector device is actuated in the other of said first and second directions.

5. The control method according to claim 4, wherein when the special automatic driving program is terminated, the last-adjusted transmission is maintained.

6. The control method according to claim 4, wherein the special automatic driving program comprises one of a driving program for a maximal economy and a driving program for maximal driving performance.

7. The control method according to claim 1, wherein a second operating mode is provided in which, by means of the selector device, a driving position is selected in which the control unit automatically selects and sets a gear of the change speed gear based on signals of the selector device and from vehicle operating values.

8. The control method according to claim 7, wherein said vehicle operating values comprise at least one of throttle valve angle, driving speed and rotational engine speed.

9. The control method according to claim 7, wherein:

the selector device can be moved in two shifting channels arranged parallel to one another;

the first shifting channel is assigned to the first operating mode;

the second shifting channel is assigned to the second operating mode;

the two shifting channels are connected with one another by a connection channel; and when the selector device is actuated from one shifting channel into the other, a respectively assigned operating mode is set.

10. A control device for an infinitely variable change speed gear of a vehicle transmission driven by an internal-combustion engine, comprising:

a selector device which can be actuated in at least two directions; and a control unit connected with the selector device, and constructed such that, in a first operating mode, when the selector device is manually operated, the transmission of the change speed gear can be influenced directly; wherein, the control unit is constructed for:

adjusting the speed-increasing ratio first by a minimum adjustment toward a higher gear when the selector device is actuated in a first direction for a duration which is less than a given time period;

carrying out a continuous adjustment toward the higher gear during a continuous actuation of the selector device;

adjusting the speed-increasing ratio first by a minimum adjustment toward a lower gear when the selector device is actuated in a second direction for a duration which is less than the given time period; and carrying out a continuous adjustment in the direction of a lower gear during a continuous actuation of the selector device in the second direction.

11. The control device according to claim 10, wherein the control unit is constructed such that:

as of the start of an actuation of the selector device in the first direction, the speed-increasing ratio is adjusted at a first given adjusting speed in the direction of a higher gear;

when an actuation of the selector device is interrupted before expiration of the given time period the speed-increasing ratio is adjusted to a predetermined value at a second given adjusting speed which is greater than the first given adjusting speed;

during an actuation of the selector device beyond the given time period, the speed-increasing ratio is adjusted continuously in the direction of a higher gear at a third given adjusting speed that is lower than the second but not lower than the first adjusting speed, until the actuation is interrupted; and when the selector device is actuated in the second direction, an adjustment is carried out analogously in the direction of a lower gear.

12. The control device according to claim 10, wherein an adjusting speed can be selected as a function of one of an actuation duration and an actuating pressure upon the selector device.

13. The control device according to claim 10, wherein upon occurrence of two actuations of the selector device in one of said first and second directions succeeding one another in a defined time window or, in the event of an overpressing of a resisting component in said one direction and receiving of a corresponding signal, a special automatic driving program is selected, in which a transmission of the change speed gear is automatically selected on the basis of detected operating values; and the special automatic driving program is terminated when the selector device is actuated in the other of said first and second directions for the first time.

14. The control device according to claim 13, wherein the control unit is constructed to maintain the last-adjusted transmission when the special automatic driving program is terminated.

15. The control device according to claim 13, wherein the control unit is constructed for adjusting a driving program for one of maximal economy and maximal driving performance, in the case of the special automatic driving program.

16. If. The control device according to claim 9, wherein the control unit is constructed to permit a second operating mode, in which the control unit automatically selects and sets a gear of the change speed gear based on signals of the selector device defining a driving position or from additional vehicle operating values.

17. The control device according to claim 16, wherein said vehicle operating values comprise at least one of throttle valve angle, driving speed and rotational engine speed.

18. The control device according to claim 16, wherein:

the selector device has a selector lever which can be moved in two shifting channels arranged parallel to one another;

the first shifting channel is assigned to the first operating mode;

the second shifting channel is assigned to the second operating mode;

the two shifting channels are connected by a connection channel; and when the selector lever is actuated from one shifting channel into the other, the respective corresponding operating mode is set.

19. The control device according to claim 10, wherein the selector device comprises a touch-type operating unit.

20. The control device according to claim 19, wherein said touch-type operating unit is situated on a vehicle steering wheel.

\* \* \* \* \*